United States Patent [19]
Cheng et al.

[11] Patent Number: 5,617,278
[45] Date of Patent: Apr. 1, 1997

[54] MAGNETIC HEAD STRUCTURE WITH REDUCTION OF MAGNETIC DOMAIN INSTABILITY

[75] Inventors: Shih-Cheng Cheng, Milpitas; Hua-Ching Tong; William C. Cain, both of San Jose, all of Calif.

[73] Assignee: Read-Rite Corporation, Milpitas, Calif.

[21] Appl. No.: 413,071

[22] Filed: Mar. 20, 1995

[51] Int. Cl.$^6$ .................................................. G11B 5/147
[52] U.S. Cl. ............................................................ 360/126
[58] Field of Search ........................... 360/113, 125–126

[56] References Cited

U.S. PATENT DOCUMENTS 5,270,893  12/1993  Sasaki et al. ............................ 360/113
5,331,728  7/1994  Argyle et al. ............................ 360/126
5,436,781  7/1995  Matono et al. .......................... 360/126
5,483,403  1/1996  Voegeli .................................... 360/126

Primary Examiner—John H. Wolff
Assistant Examiner—George J. Letscher
Attorney, Agent, or Firm—Nathan N. Kallman

[57] ABSTRACT

Boundary protrusions or kinks are integrally formed along the perimeter of a magnetic layer of a magnetic transducer for nucleating a predetermined domain pattern in the magnetic layer. These protrusions or kinks behave as domineering pinning sites for the domain walls, overriding other factors such as manufacturing tolerances or external magnetic field, for establishing a stable magnetic domain pattern. As arranged, various kinds of noise encountered during the normal operations of the transducer are significantly reduced, as the noise related problems originated from the magnetic domain instabilities in the magnetic layers are substantially curtailed.

14 Claims, 4 Drawing Sheets

MAGNETIC HEAD STRUCTURE WITH REDUCTION OF MAGNETIC DOMAIN INSTABILITY

FIELD OF THE INVENTION

This invention relates to magnetic transducers and in particular to thin film magnetic transducers having magnetic poles with stabilized magnetic domain patterns.

BACKGROUND OF THE INVENTION

A typical thin film magnetic recording head or transducer is configured with two magnetic thin film layers that are formed of a nickel-iron composition, such as Permalloy material, and which are generally designated as the P1 and P2 layers. The P1 and P2 layers sandwich an electrical coil surrounded by insulating material. The P1 and P2 layers form a back closure whereas the pole tip region adjacent to the transducing gap is narrowed to approximate a relatively smaller funnel-like portion. The Permalloy material is characterized by a magnetic domain structure, which in its ideal form should consist of vertical hexagonal domains, with their easy axes perpendicular to the direction of flux propagation, on every section of the head. However, it has been observed that most magnetic heads show horizontal domains, with the undesirable easy axes parallel to the direction of flux flow, on the P2 pole-tip region of the head. These horizontal domains do not return to their equilibrium configurations after an external magnetic field is applied. Signal noise also known as "wiggles" is generally caused by the instability of magnetic domain walls.

Major causes of the undesirable easy axes formation are the compressive stress which occurs at the narrowed pole tip region, and the variations of the Permalloy compositions, or the nickel to iron ratios. It is very difficult, from a manufacturing standpoint, to strictly control these two factors. Composition uniformity to specifications is costly and difficult to control, due to the complicated head geometries and the large stack height variation across the head. Stress control is extremely difficult to achieve, since a complete head consists of more than ten layers and has to go through several annealing processes. The stresses of each layer change not only after each layer is stacked, but also after the Permalloy experiences each annealing process. Although stresses of each single layer can be carefully controlled during fabrication, they still become unpredictable after a complete head is made. Therefore, strict composition and stress control are difficult to produce heads reliably with the desirable easy axes near the pole tip region.

FIG. 1 illustrates a prior art transducer designated by reference numeral 2. The hatched area 3 represents the portions of the two poles P1 and P2 in direct contact at the back closure region. The ideal magnetic domain pattern 4 of the magnetic pole is illustrated with dashed lines. The ideal domain pattern 4 generally comprises a plurality of main domains 6 surrounded by a plurality of closure domains 8. The magnetic domains 6 and 8 are partitioned in an orderly manner by domain walls 10. The direction of magnetization in each of the magnetic domains 6 and 8 are oriented in parallel with their respective groups of easy axes 6A–6B and 8A–8B. Domain pattern 4 is an ideal design goal in which the easy axes of the main domains 6A and 6B are perpendicular to the directions of flux flow 12 and 14 during the write and read modes, respectively. However, in practice, securing an ideal magnetic domain pattern 4 in the magnetic poles as shown in FIG. 1 is not easy. The formation of an equilibrium magnetic domain pattern in the magnetic poles depends on a variety of factors. Examples of the various factors are the geometrical shape, thickness, granular defects, temperature and mechanical stress and composition of the magnetic poles. The underlying principle is that the final domain pattern always stabilizes itself to achieve the lowest magnetic energy state. However, the final domain pattern is unpredictable. This is especially true when the magnetic poles are fabricated through a large number of manufacturing steps. To compound the situation further, the magnetic domain pattern is ever changing under the influence of external factors. A change in the magnetic domain pattern during normal operation manifests itself as electrical noise which is detrimental to the performance of the magnetic transducer.

To illustrate the dynamic nature of the magnetic domains in the magnetic pole, assume that the ideal magnetic domain pattern 4 as shown in FIG. 1 is established in the magnetic pole after manufacturing. The undesirable domain configuration, such as pattern 5 shown in FIG. 2, occurs frequently. Typically, some of the domain walls merge together resulting in a reduced number of main and closure domains 6 and 8. This time, the easy axes of some of the domains, such as axes 18A and 18B of domains 18, may not be perpendicular to the flux direction 12. Domains 18 are sometimes called horizontal domains, in contrast with the vertical domains 20 in which the easy axes 20A and 20B are perpendicular to the direction of magnetic flux 12. Upon the withdrawal of the write current, the domain configurations in FIG. 2 do not return to their original equilibrium positions after each write action. Therefore the readback signal changes after each write action. The readback signal also shows the undesirable signals superimposing on the major peak, which can cause bit shift that results in higher error rate. These noises are commonly called "wiggles". A transducer thus fabricated is not suitable for high frequency and high recording density applications.

Various techniques have been suggested and attempted in the past for securing stable domain patterns in the magnetic poles. For example, alloy composition in the magnetic poles has been plated with high degree of uniformity under tight monitoring controls, in an effort to prevent domain formations along the sites of alloy granular defects. Magnetic poles have also been designed with geometrical shapes having proper aspect ratios to accommodate the natural periodicity of the magnetic domains. None of these techniques has demonstrated any satisfactory working results.

The constant demand for electronic products with compact sizes and portable features prompts manufacturers to provide storage devices with ever decreasing geometries. As a result, recording media are designed for narrower track widths and higher linear recording density applications. Transducers with high error rate are incapable of interacting with such recording media. There is a long-felt and increasing need for a magnetic transducer free of the aforementioned problems.

SUMMARY OF THE INVENTION

An object of this invention is to provide a thin film magnetic transducer with reduced domain related magnetic instability and with improved signal-to-noise ratio.

Another object is to provide novel structural designs of the magnetic poles of thin film magnetic head without the need for elaborate and added manufacturing steps.

In a preferred embodiment of the invention, boundary kinks or protrusions are integrally formed along the perimeter of the magnetic poles for the purpose of nucleating a predetermined domain pattern. These kinks or protrusions behave as dominant pinning sites for the domain walls, overriding other factors such as manufacturing defects or thermal stress, for establishing a stable domain pattern.

These and other features and advantages of the invention will be apparent to those skilled in the art from the following detailed description, taken with the accompanying drawings, in which like reference numerals refer to like parts.

DETAILED DESCRIPTION OF THE INVENTION

Figure 1:
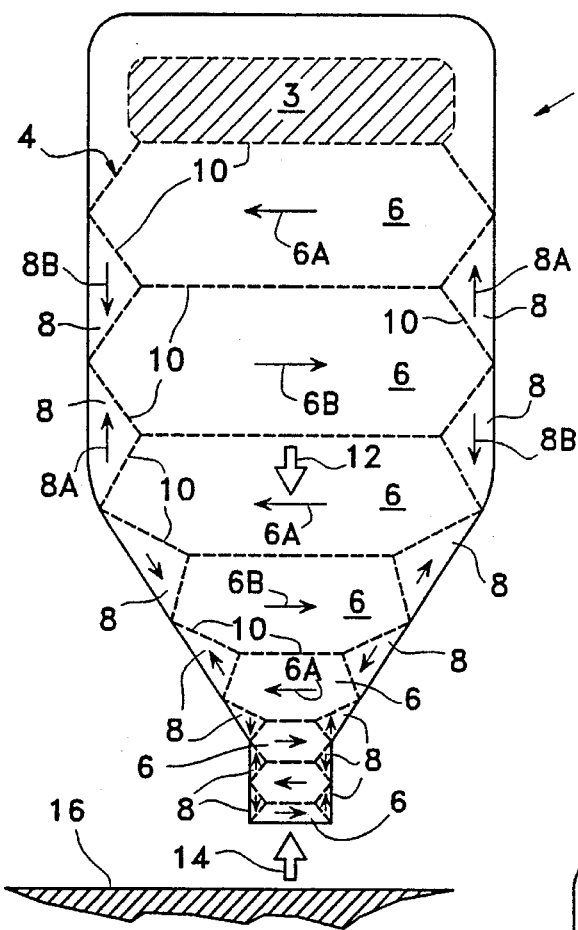
FIG. 1 is a top plan view of a magnetic pole of a prior art transducer having an ideal magnetic domain pattern.
Figure 2:
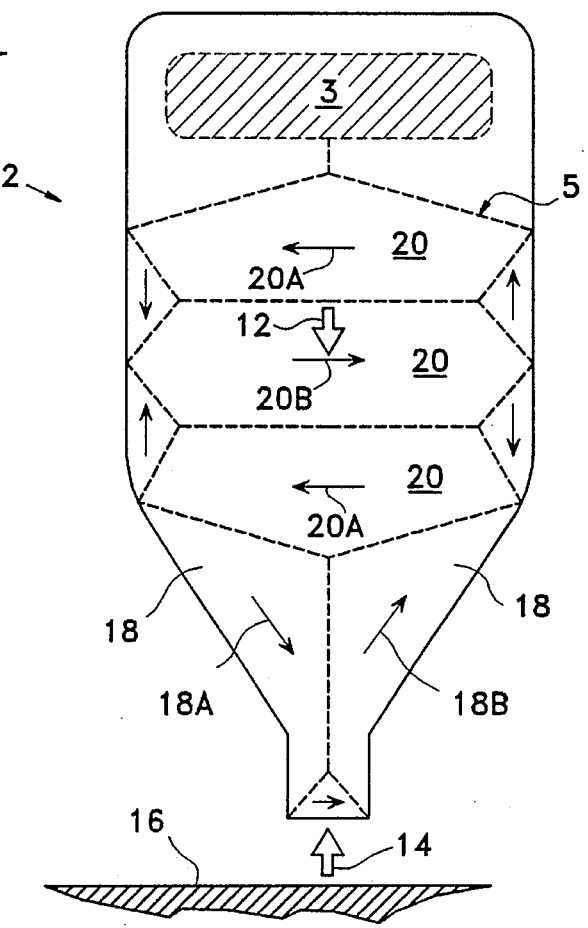
FIG. 2 is a top plan view which shows the magnetic pole of FIG. 1 with undesirable patterns being induced.
Figure 3:
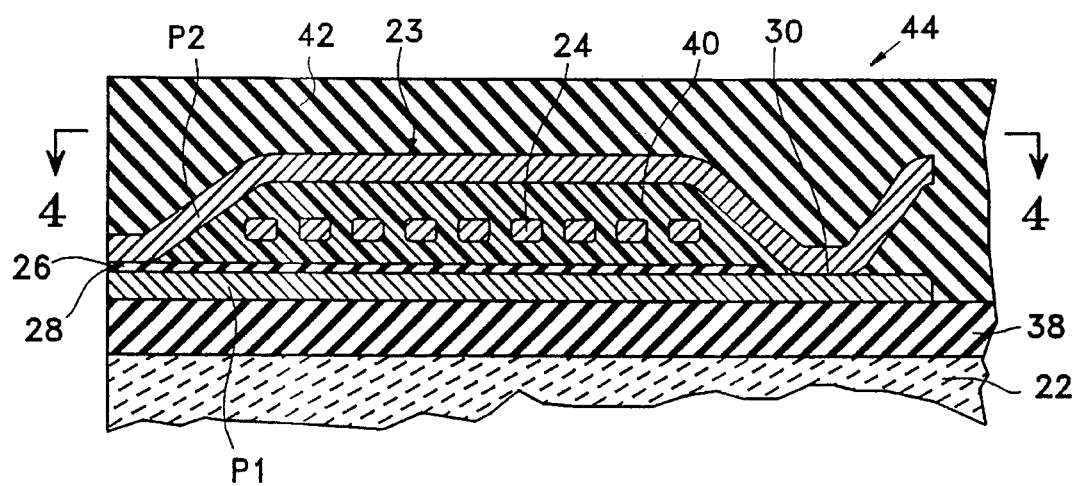
FIG. 3 is a cross-sectional side view of the preferred embodiment of the present invention illustrating the multi-layered feature of the transducer.
Figure 4:
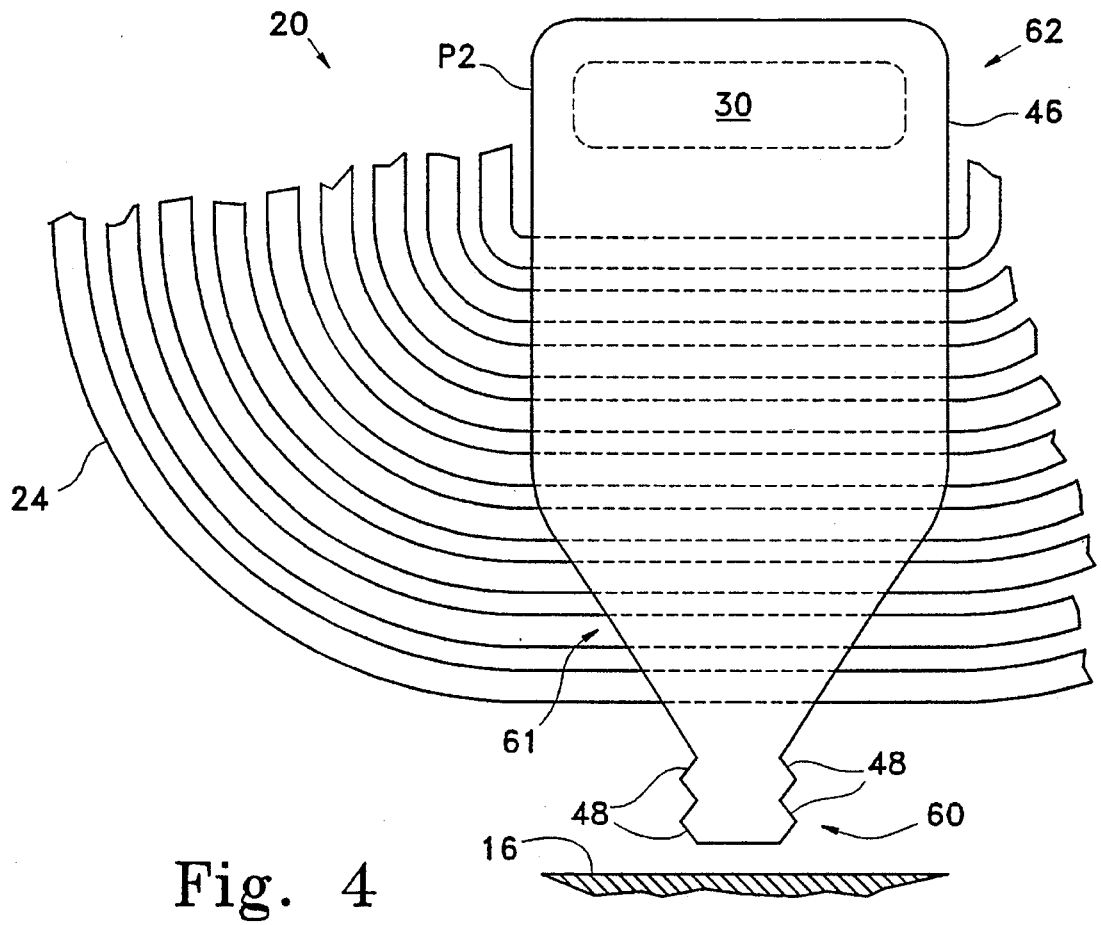
FIG. 4 is a top elevational view taken along the line 4—4 of FIG. 3.

Reference is now made to FIGS. 3 and 4 which show the preferred embodiment of the invention. FIG. 4 is an elevational plan view taken along line 4—4 of FIG. 3. The magnetic transducer of the present invention is designated by reference numeral 20 which comprises a multilayer structure formed on a substrate 22. The substrate 22 is preferably made of a non-magnetic material, such as ceramic. Inside the transducer 20 is a yoke 23 comprising two magnetic layers P1 and P2 normally made of a material having a high permeability and a low coercive force. An example of such a material is Permalloy, which is a nickel-iron (NiFe) composition. Disposed between the two magnetic layers P1 and P2 is an electrically conductive coil 24, insulated by insulating material 40. At one end, poles P1 and P2 are separated by an insulating layer 26 which defines a read-write gap 28. At the other end, P1 and P2 are joined together at a back closure region 30. There is also another dielectric layer 38 disposed between the pole P1 and the substrate 22. In addition, an insulating overcoat 42 that serves as a protective layer is also deposited on top of the entire thin film head structure.

Figure 5:
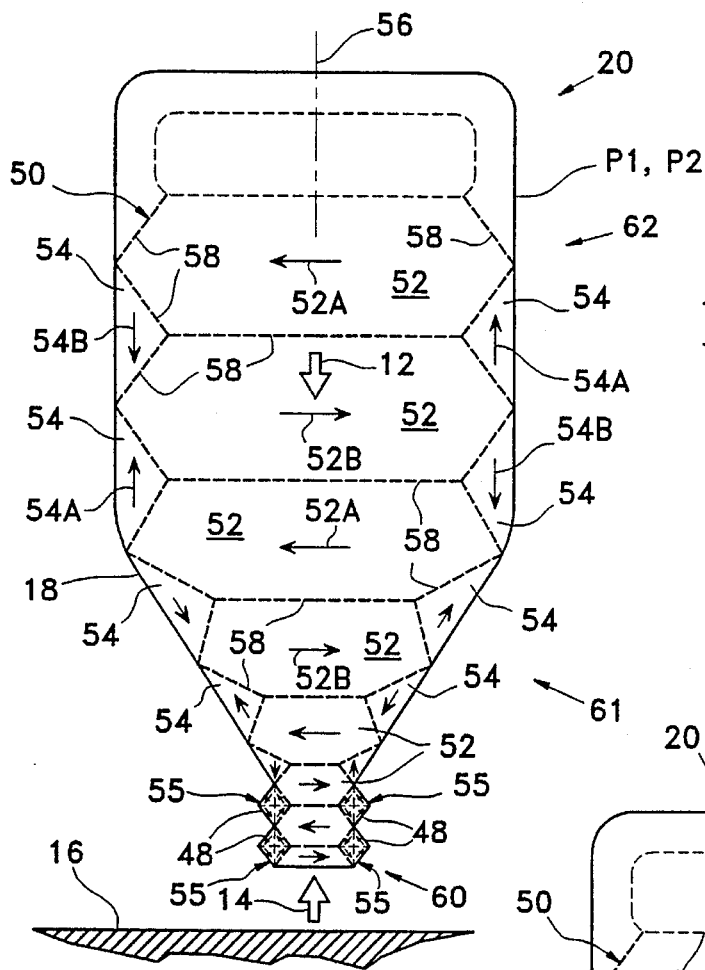
FIG. 5 is a top plan view of the magnetic pole shown in FIGS. 3–4 having an equilibrium domain pattern in the quiescent mode.

During the write mode, electrical current with information passing through the inductive coil 24 induces magnetic flux into the magnetic layers P1 and P2. The induced magnetic flux flows through the poles P1 and P2, reaching the read-write transducing gap 28 and registers signals representing the magnetic flux on a moving recording medium 16, such as a rotating magnetic disk 16 (FIG. 5). During the read mode, magnetic flux emanating from a traveling recording medium 16 is intercepted by the magnetic pole tips of P1 and P2 and flows into the inductive coil 24. Changes in magnetic flux correspondingly induces in the inductive coil 24 electrical voltage which constitutes the information read out from the recording medium 16.

It should be noted that FIG. 4 is a top plan view of transducer 20 having the various insulating layers such as insulating overcoat 42 removed for the sake of clarity. The pole P2 generally comprises a closed boundary 46 enclosing a shoulder portion 61 disposed between a tip portion 60 and a body portion 62. Integrally formed along closed boundary 46 are nucleating means such as boundary protrusions 48 installed for a specific purpose which is herein explained.

Attention is now directed to FIG. 5 which shows the magnetic pole P1 or P2 of the present invention having a predetermined magnetic domain pattern 50. Preferably, the predetermined domain pattern 50 includes a plurality of main domains 52 orderly stacked along a central line 56 of each of the poles P1 and P2. Main domains 52 are sometimes called the vertical domains mainly because their easy axes 52A and 52B are perpendicular to the directions of flux flow 12 and 14. As was mentioned earlier, the quiescent domain pattern 50 is determined by multiple factors. However, in this case, boundary protrusion 48 emerges as the domineering factor carrying out the duty of nucleating the domain walls 58. Phrased differently, nucleating means such as boundary protrusions 48 act as nucleating sites for defining the magnetic domain pattern 50.

Figure 6:
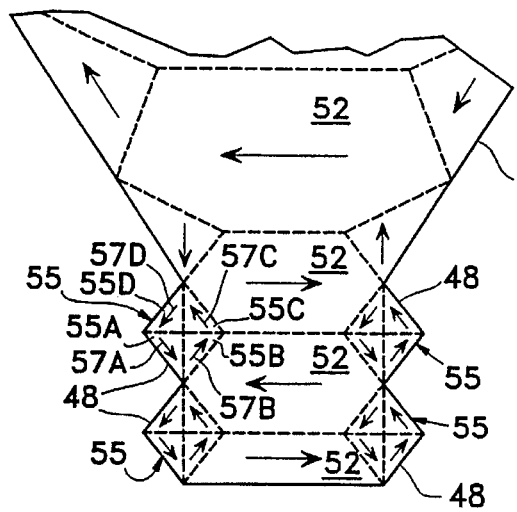
FIG. 6 is an enlarged view of the tip portion of the magnetic pole, in part, of FIG. 5 showing the quadruple closure domains near the pole boundary.

Reference is now made to FIG. 6 which shows an enlarged view of the tip portion 60 of the magnetic pole P1 or P2. Each angular protrusion 48 includes a quadruple closure domain 55 having sub-domains 55A–55D. Easy axes 57A–57D of the respective sub-domains 55A–55D circulate with each other within the sub-domain 55. As a consequence, these quadruple domains 55 can withstand adverse operating environments and their original pattern can substantially remain intact. With domain pattern at the tip portion 60 of each of poles P1 and P2 secured, an orderly domain pattern at the body portion 62 follows.

As different from most prior art magnetic poles in which during the write process, the magnetic domains merge and separate unpredictably, no such activities take place with the magnetic pole of the present invention.

Figure 7:
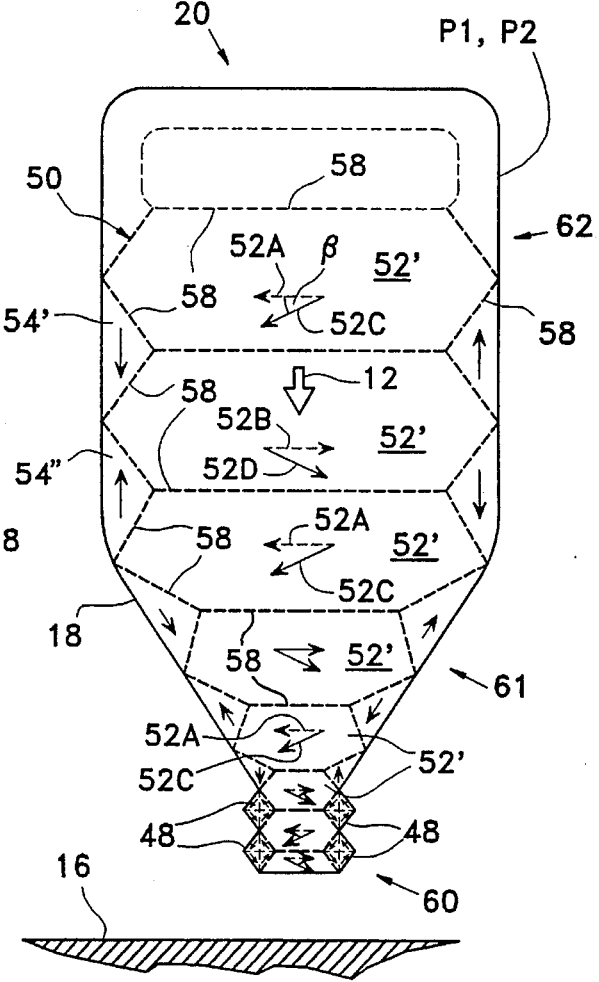
FIG. 7 is a top plan view of the magnetic pole of FIG. 6 having the predetermined domain pattern slightly perturbed in the active write mode.

FIG. 7 which shows the domain pattern of one of the magnetic poles P1 and P2 under the active write mode. Magnetic flux induced by the coil 24 (FIG. 4) flows in the direction 12 and emanates out of the tip portion 60 into the recording medium 16. With the boundary protrusions 48 in place acting as nucleating sites, the domain wall pattern adjacent the tip portion 60 remains intact. As a consequence, the overall domain pattern 50 does not appreciably change very much. However, the direction of magnetization in each of the main domains 52' rotates correspondingly at a small angle in response to the changes in magnetic flux emitting from the traveling storage medium 16. As shown in FIG. 7, the easy axis 52C of the main domain 52' deviates from the original axis 52A at an angle β in response to the external magnetic flux. At the same time, closure domains having easy axes in the direction of the induced magnetic flux 12 enlarge in size at the expense of the other domains having opposite counterparts. For example, as shown in FIG. 7, the closure domain 54' slightly expands in size while the closure domain 54" shrinks proportionally. In general, the domain walls 58 are only slightly perturbed and the predetermined domain pattern 50 is essentially preserved. Operating from the active write mode to the active read or quiescent modes, the domain pattern 50 basically restores to its original form. Since there are no merging or splitting of domain walls, the operation of the transducer 20 is substantially free of wiggle.

Figure 8:
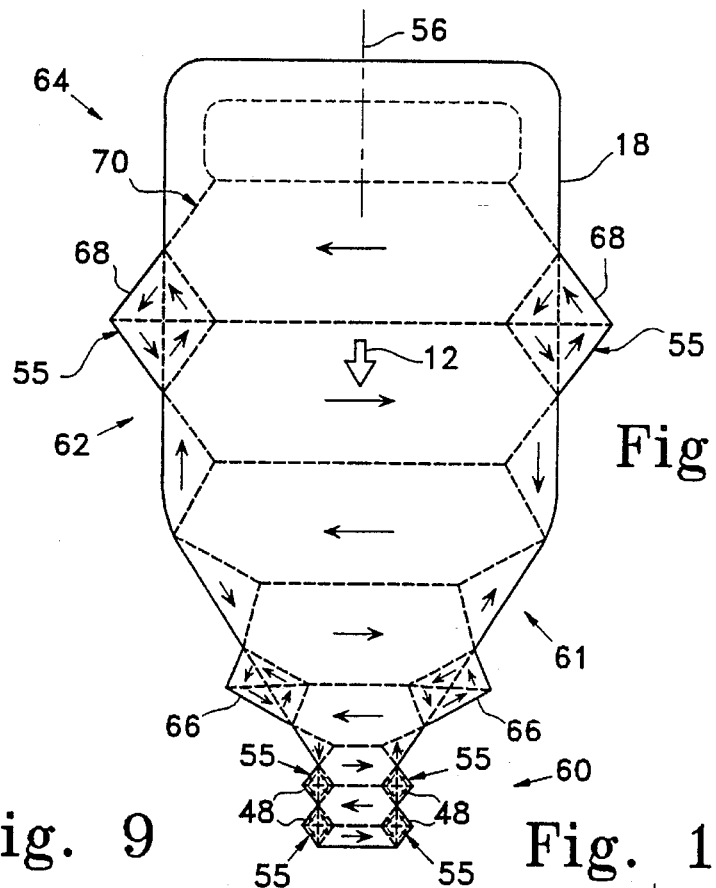
FIG. 8 shows a second embodiment of the invention having the magnetic domain nucleating protrusions integrally formed along the tip, shoulder and body portions of the magnetic pole.

A second embodiment of the present invention is shown in FIG. 8. The magnetic pole of this embodiment is designated by reference numeral 64 which comprises a tip portion 60, shoulder portion 61 and a body portion 62. Angular protrusions 66 and 68 are integrally formed along the magnetic pole boundary line 18 at the shoulder and body portion 61 and 64, respectively. The implementation of the extra protrusions 66 and 68 provides a somewhat more stable magnetic domain pattern 70 at the expense of larger surface area for the magnetic pole 64. The principle of operation is essentially similar to the previously described embodiment and is therefore not further elaborated herein.

Figures 9, 10:
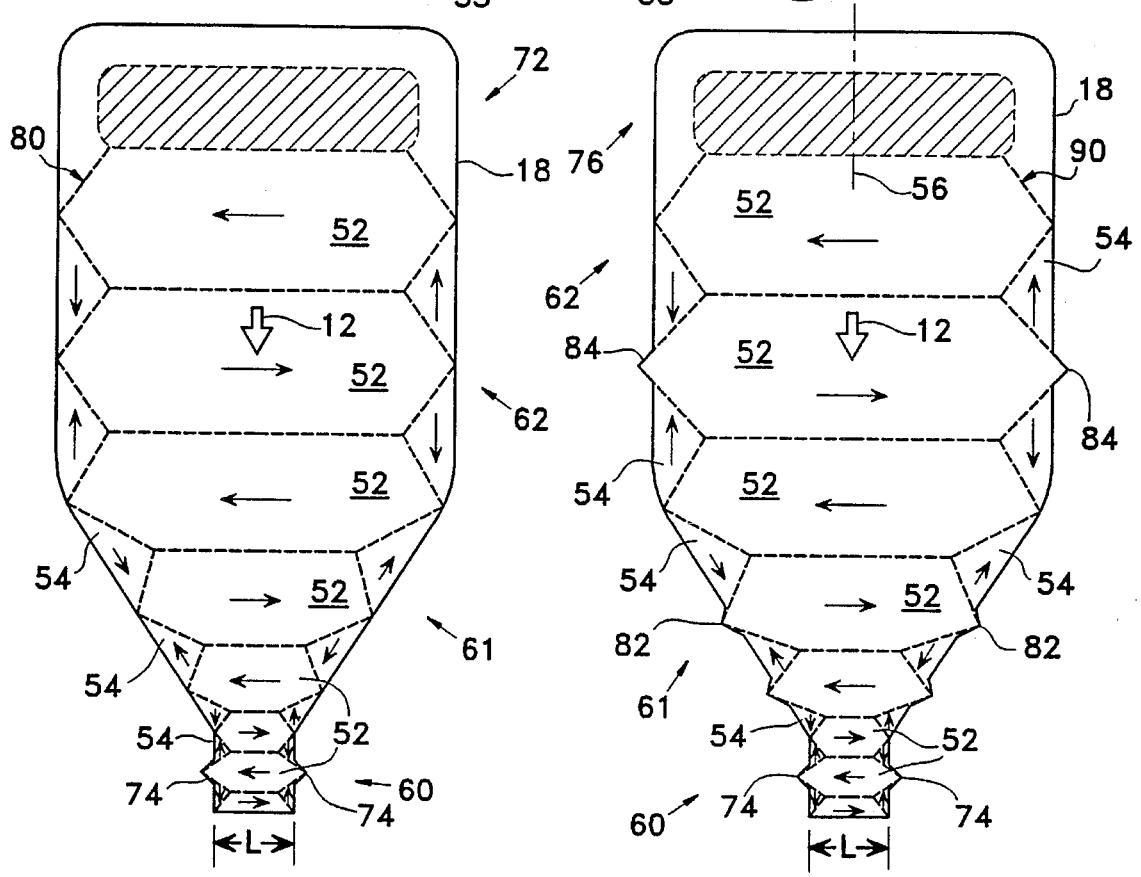
FIG. 9 shows a third embodiment of the invention having boundary kinks integrally formed in the magnetic pole for nucleating the magnetic domains.
FIG. 10 shows a fourth embodiment of the invention having boundary kinks integrally formed along the tip, shoulder and body portions of the magnetic pole.

Shown in FIGS. 9 is a third embodiment of the invention in which the magnetic pole is designated by reference numeral 72. In this embodiment, means for nucleating the magnetic domains is in the form of boundary kinks 74 integrally formed along the tip portion 60 of the magnetic pole 72. Differing from the previous embodiments, the physical size of a boundary kink 74 is relatively small in comparison with the lateral dimension L of the tip portion 60. There are no quadruple domains enclosed within the boundary kinks 74. Instead, the boundary kinks behave as direct pinning sites for the magnetic domains 52 and 54. Boundary kinks 74 confine the magnetic domains 52 and 54 for a secured magnetic domain pattern 80 during the various modes of operation of the magnetic transducer 72.

Shown in FIG. 10 is a fourth embodiment of the invention in which the magnetic pole is designated by reference numeral 76. The difference between this embodiment and the third embodiment shown in FIG. 9 is the extra boundary kinks 82 and 84 integrally formed on the shoulder portion 61 and the body portion 62, respectively, of the magnetic pole 76. The symmetrical distribution of the boundary kinks 74, 82 and 84 about the center line 56 and along the magnetic pole boundary line 18 provides a somewhat more stable domain pattern 90. The principles of operation are substantially similar to the previous embodiments and are therefore not repeated herein.

Magnetic poles can be fabricated through the conventional thin film process. However, the design of the magnetic poles of the present invention can be facilitated with the help of a Kerr microscope. To begin with, a blank magnetic pole without angular protrusions or kinks is first made available. The blank magnetic pole is then placed under the Kerr microscope. Due to the Kerr rotation of the reflected light, the magnetic domain pattern in the magnetic layer is rendered visible. The image of the magnetic domain pattern can be captured on a photograph, for example. Thereafter, the size, shape and location of the nucleating means, such as angular protrusions or kinks, can be designed based on the captured image.

While the present invention has been shown and described with reference to the preferred embodiment thereof, it will be understood by those skilled in the art that other changes in form and detail may be made therein without departing from the scope and spirit of the invention defined by the appended claims.

What is claimed is:

1. A thin film magnetic transducer having active read and write modes and a quiescent mode, comprising:

a magnetic pole having a closed boundary including a plurality of domain walls defining a magnetic domain pattern; and means comprising boundary kinks or protrusions integrally formed along said closed boundary of said magnetic pole for nucleating said plurality of domain walls, said nucleating means comprising an integral portion of said magnetic pole angularly protruding beyond said closed boundary, wherein said integral portion of said magnetic pole angularly protruding beyond said boundary includes one half of a quadruple closure domain, characterized in that said domain walls remain substantially intact operating from the active write mode to the quiescent mode, and further remain substantially intact operating from the active write mode to the active read mode.

2. The thin film magnetic transducer as set forth in claim 1 wherein said magnetic pole comprises a tip portion, a shoulder portion and a body portion, said shoulder portion being disposed between said tip portion and said body portion.

3. The thin film magnetic transducer as set forth in claim 2 wherein said means for nucleating said domain walls is integrally formed in said tip portion.

4. The thin film magnetic transducer as set forth in claim 2 wherein said means for nucleating said domain walls is integrally formed in said shoulder portion.

5. The thin film magnetic transducer as set forth in claim 2 wherein said means for nucleating said domain walls is integrally formed in said tip, shoulder and body portions.

6. A thin film magnetic transducer for converting changes in magnetic flux from a recording medium into electrical signals during an active read mode, and for converting electrical signals into magnetic flux onto the recording medium during an active write mode, and further including a quiescent mode, comprising:

a yoke having first and second magnetic poles, each of said magnetic poles having a closed boundary including a plurality of domain walls defining a magnetic domain pattern, each of said magnetic poles including a tip portion and a body portion; and means comprising boundary kinks or protrusions integrally formed in said tip portion along said closed boundary of each of said magnetic poles for nucleating said plurality of domain walls, said nucleating means containing said domain walls in each of said magnetic poles, wherein said means for nucleating said domain walls comprise an integral portion of said magnetic layer angularly protruding beyond said boundary, wherein said integral portion of said magnetic pole angularly protruding beyond said boundary includes one half of a quadruple closure domain, such that said domain walls remain substantially intact operating from the active write mode to the quiescent mode, and such that said domain walls remain substantially intact operating from the active write mode to the active read mode.

7. The thin film magnetic transducer as set forth in claim 6 wherein each of said magnetic poles includes a shoulder portion disposed between said tip portion and said body portion, and boundary kinks being integrally formed in said shoulder portion.

8. The thin film magnetic transducer as set forth in claim 6 further comprising an electrically conductive coil dielectrically disposed between said first and second magnetic poles.

9. A thin film magnetic transducer for converting changes in magnetic flux from a recording medium into electrical signals during an active read mode, and for converting electrical signals into magnetic flux onto the recording medium during an active write mode, and further including a quiescent mode, comprising:

a magnetic layer having a closed boundary including a plurality of domain walls defining a magnetic domain pattern, said magnetic layer further including a tip portion, a shoulder portion and a body portion; and means comprising boundary kinks or protrusions angularly protruding beyond said closed boundary integrally formed along said closed boundary of said magnetic layer for nucleating said plurality of domain walls, wherein each of said integral portions of said magnetic layer angularly protruding beyond said boundary includes one half of a quadruple closure domain, said nucleating means confining said domain walls such that said domain walls remain substantially intact operating from the active write mode to the quiescent mode, and further remain substantially intact operating from the active write mode to the active read mode.

10. The thin film transducer as set forth in claim 8 wherein said tip, shoulder and body portions are disposed along a symmetrical line passing through said magnetic layer.

11. The thin film magnetic transducer as set forth in claim 9 wherein said means for nucleating said domain walls comprise a pair of integral portions of said magnetic layer angularly protruding beyond said boundary, and further symmetrically disposed along said symmetrical line.

12. The thin film magnetic transducer as set forth in claim 11 wherein said pair of integral portions of said magnetic layer is integrally formed in said tip portion.

13. The thin film magnetic transducer as set forth in claim 11 wherein said pair of integral portions of said magnetic layer is integrally formed in said shoulder portion.

14. The thin film magnetic transducer as set forth in claim 11 wherein said pair of integral portions of said magnetic layer is integrally formed in said tip and shoulder portions.

* * * * *